(12) United States Patent
Hsu

(10) Patent No.: US 6,983,774 B2
(45) Date of Patent: Jan. 10, 2006

(54) TIRE REINFORCING ARRANGEMENT

(76) Inventor: Shut Chen Hsu, No. 7, Alley 1, Lane 163, Sec. 3, Nung-Chuan Rd., I Lan City (TW)

( * ) Notice: Subject to any disclaimer, the term of this patent is extended or adjusted under 35 U.S.C. 154(b) by 49 days.

(21) Appl. No.: 10/679,306

(22) Filed: Oct. 7, 2003

(65) Prior Publication Data

US 2005/0039833 A1    Feb. 24, 2005

(30) Foreign Application Priority Data

Aug. 20, 2003  (TW) ............................... 92122934 A

(51) Int. Cl.
*B60C 17/04*      (2006.01)
(52) U.S. Cl. ..................... 152/156; 152/520; 152/248
(58) Field of Classification Search ................ 152/158, 152/152, 159, 165, 169, 520, 391, 400, 248
See application file for complete search history.

(56) References Cited

U.S. PATENT DOCUMENTS

| 5,988,244 A * | 11/1999 | Chang ........................ 152/158 |
| 6,637,486 B1 * | 10/2003 | Rolla ....................... 152/381.6 |
| 6,705,368 B2 * | 3/2004 | Glinz et al. ................. 152/400 |
| 2004/0016490 A1 * | 1/2004 | Shimura et al. ............ 152/156 |

* cited by examiner

*Primary Examiner*—Frantz F. Jules
(74) *Attorney, Agent, or Firm*—Rosenberg, Klein & Lee

(57) ABSTRACT

A tire reinforcing arrangement includes an outer tire having two hooked flanges at two sides, two annular spare tires bilaterally set inside the outer tire, each annular spare tire being formed of a plurality of spare tire blocks that are fastened to one another by links and screw bolts, each spare tire block having two mounting through holes, a top locating groove adapted to receive the hooked flanges of the outer tire, an embossed bottom wall, and two projecting portions diagonally disposed at two ends, and stretchers respectively stopped between the annular spare tires.

1 Claim, 8 Drawing Sheets

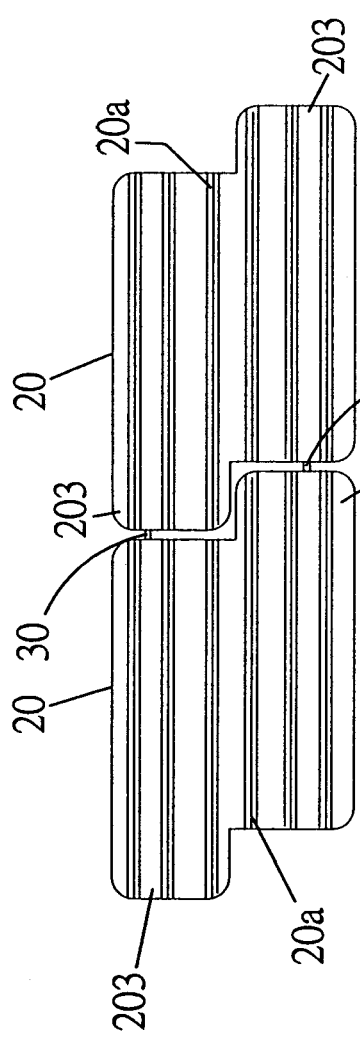
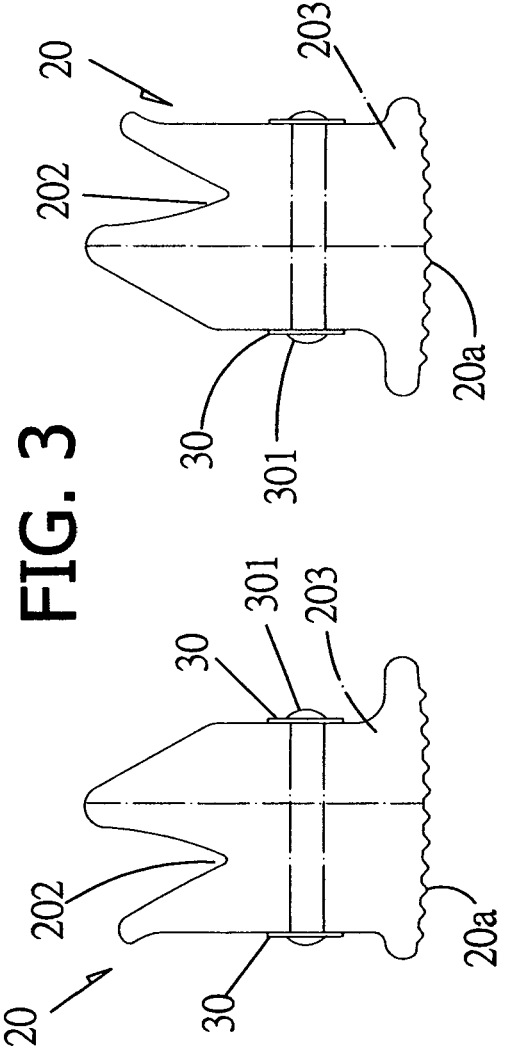

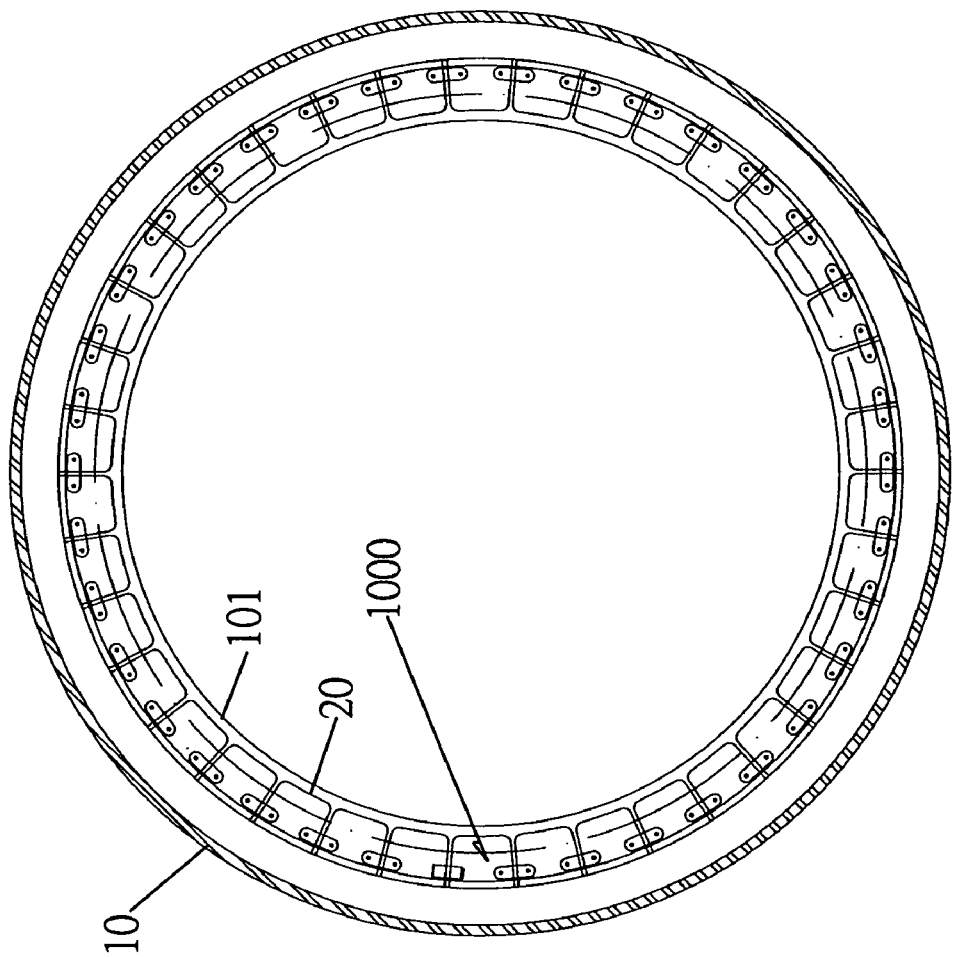
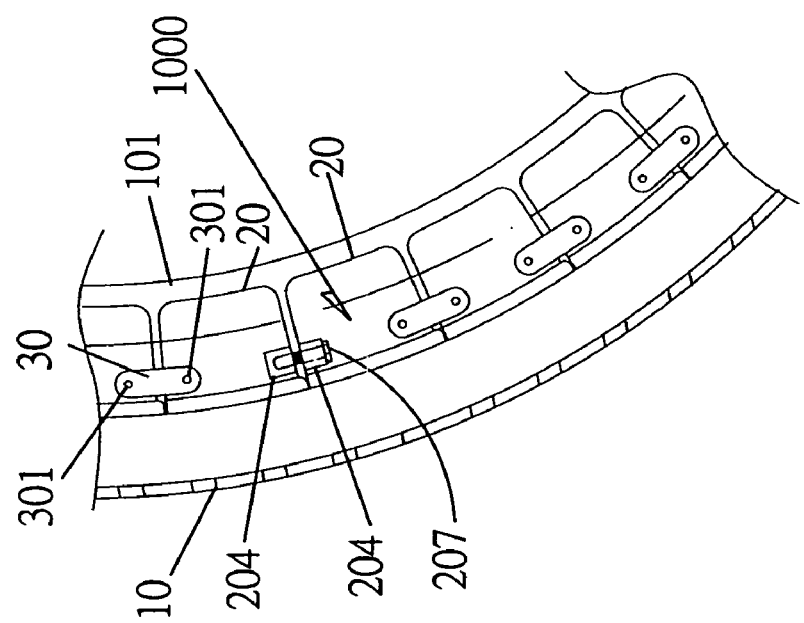
FIG. 10

TIRE REINFORCING ARRANGEMENT

BACKGROUND OF THE INVENTION

1. Field of the Invention

The present invention relates to vehicle tires and, more particularly, to such a vehicle tire, which is reinforced with inner spare tires.

2. Description of the Related Art

Conventional vehicle tires include two types, namely, the one with inner tube and the other without inner tube. A tire with an inner tube is inflatable. When the inner tube of a tire pierced by a pointed external object, it leaks, and the driver must stop the car immediately. A sudden explosion of a tire may cause a traffic accident when the car is running on a freeway. A tubeless tire or the so-called high-speed tire does not explode when pierced by a pointed external object, giving a sufficient time to let the driver drive the car to a garage for repair. However, because no significant tire pressure loss is shown when one tire of the car was pierced by a pointed external object, the driver may keep driving the car on a highway or freeway. In this case, an accident may occur.

Therefore, it is desirable to provide a tire reinforcing arrangement that eliminates the aforesaid problems.

SUMMARY OF THE INVENTION

The present invention has been accomplished under the circumstances in view. It is the main object of the present invention to provide a tire reinforcing arrangement, which allows the car driver to keep driving the car safety for a certain period of time in case one tire of the tire is pierced by a pointed external object. It is another object of the present invention to provide a tire reinforcing arrangement, which is easy to install. It is still another object of the present invention to provide a tire reinforcing arrangement, which fits tires of different sizes.

To achieve these and other objects of the present invention, the tire reinforcing arrangement comprises an outer tire, outer tire comprising hooked flanges respectively extended along two opposite sidewalls thereof on the inside; two annular spare tires bilaterally set inside the outer tire, the annular spare tire each comprising a plurality of spare tire blocks, the spare tire blocks each comprising two mounting through holes transversely extended through two opposite sides thereof, a top locating groove adapted to receive the hooked flanges of the outer tire, an embossed bottom wall, and two projecting portions diagonally disposed at two ends, a plurality of links adapted to join the spare tire blocks, and a plurality of screw bolts respectively fastened to the mounting through holes to secure the links to the spare tire blocks; and a plurality of stretchers respectively stopped between the annular spare tires, the stretchers each having two end lugs respectively stopped against the annular spare tires, a U-shaped middle part, and a rubber bonded to the U-shaped middle part.

BRIEF DESCRIPTION OF THE DRAWINGS

FIG. 3 is a bottom view showing two spare tire blocks attached together according to the present invention.

FIG. 5 is schematic front and rear views of the spare tire block according to the present invention.

FIG. 10 is a schematic sectional view showing the tire reinforcing arrangement assembled according to the present invention.

DETAILED DESCRIPTION OF THE PREFERRED EMBODIMENT

Figure 1:
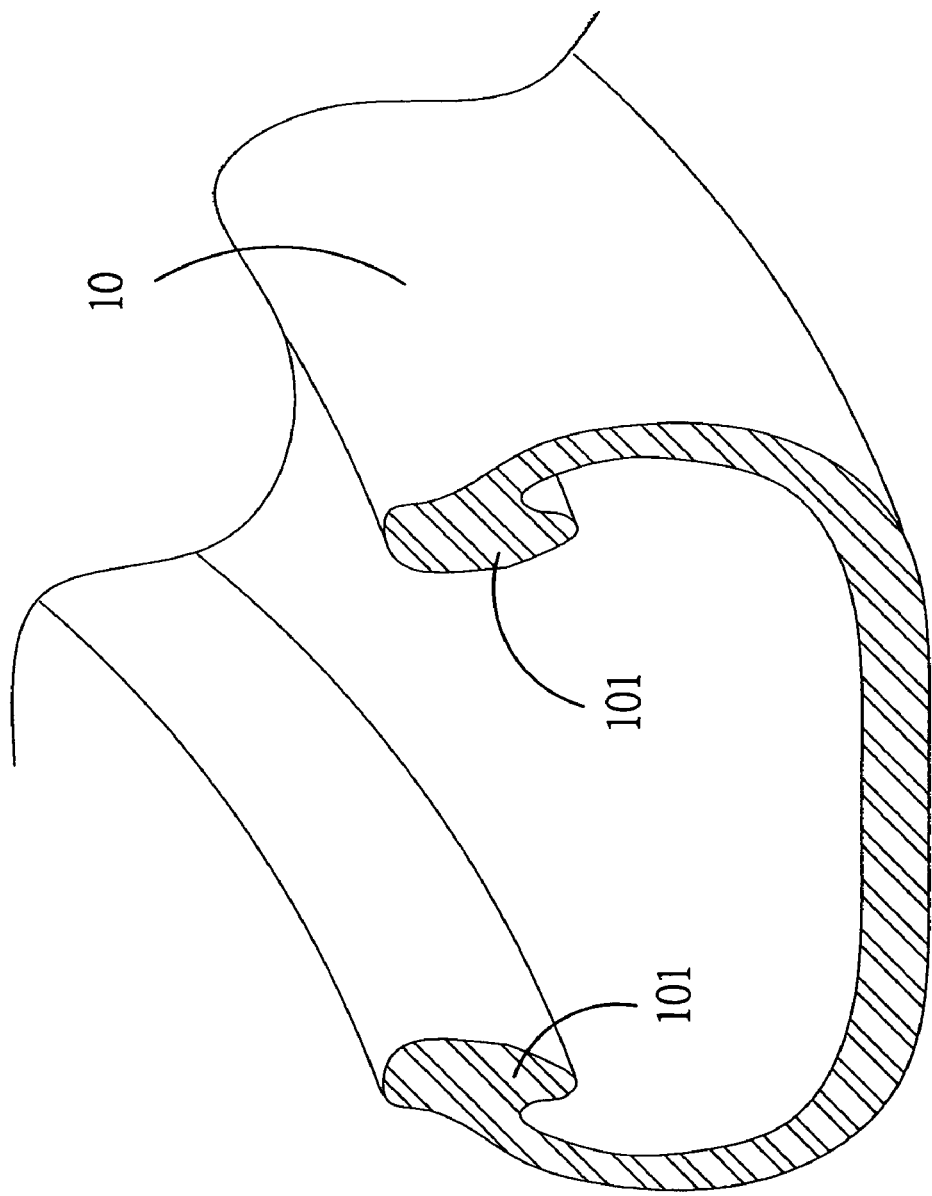
FIG. 1 is a sectional elevation of an outer tire according to the present invention.
Figure 2:
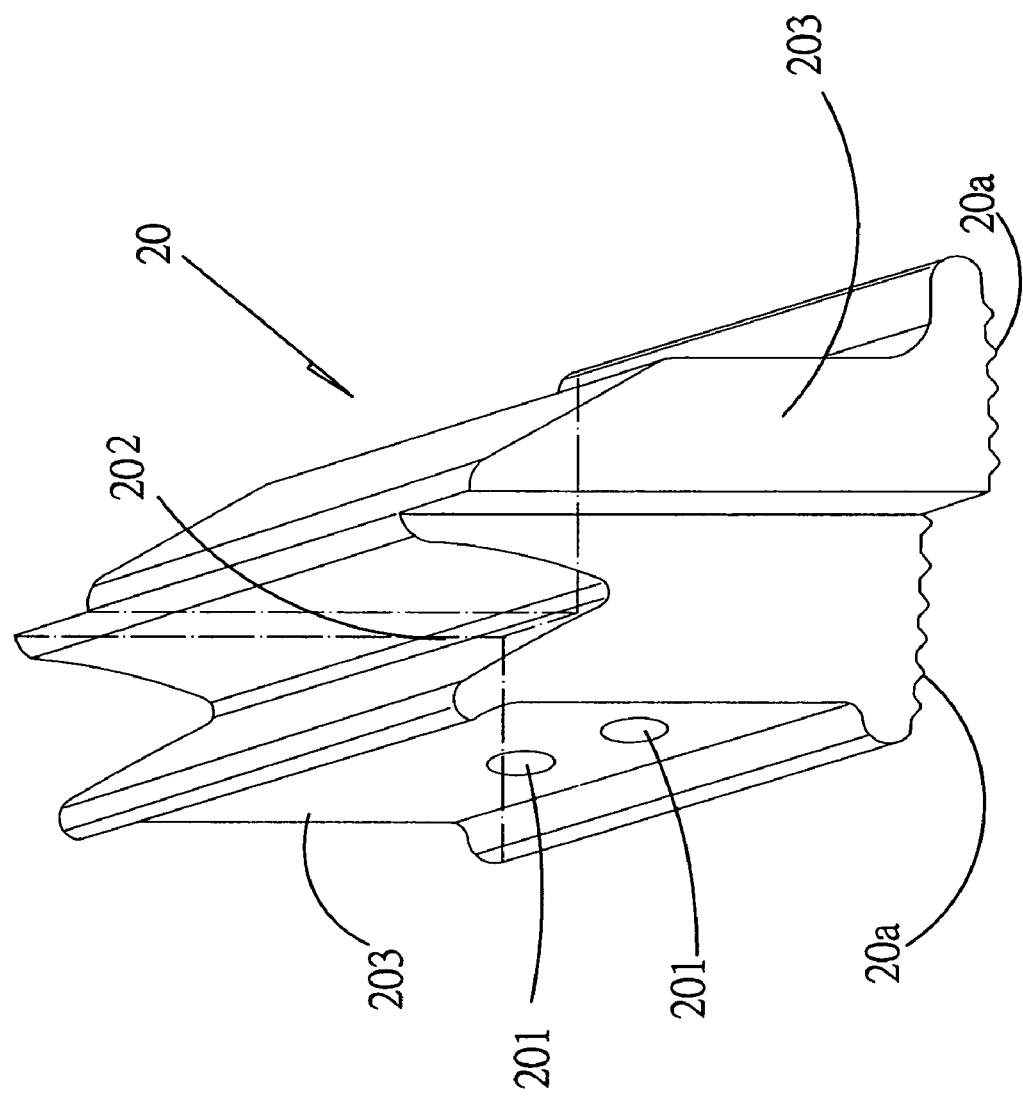
FIG. 2 is an elevational view of a spare tire block according to the present invention.
Figure 4:
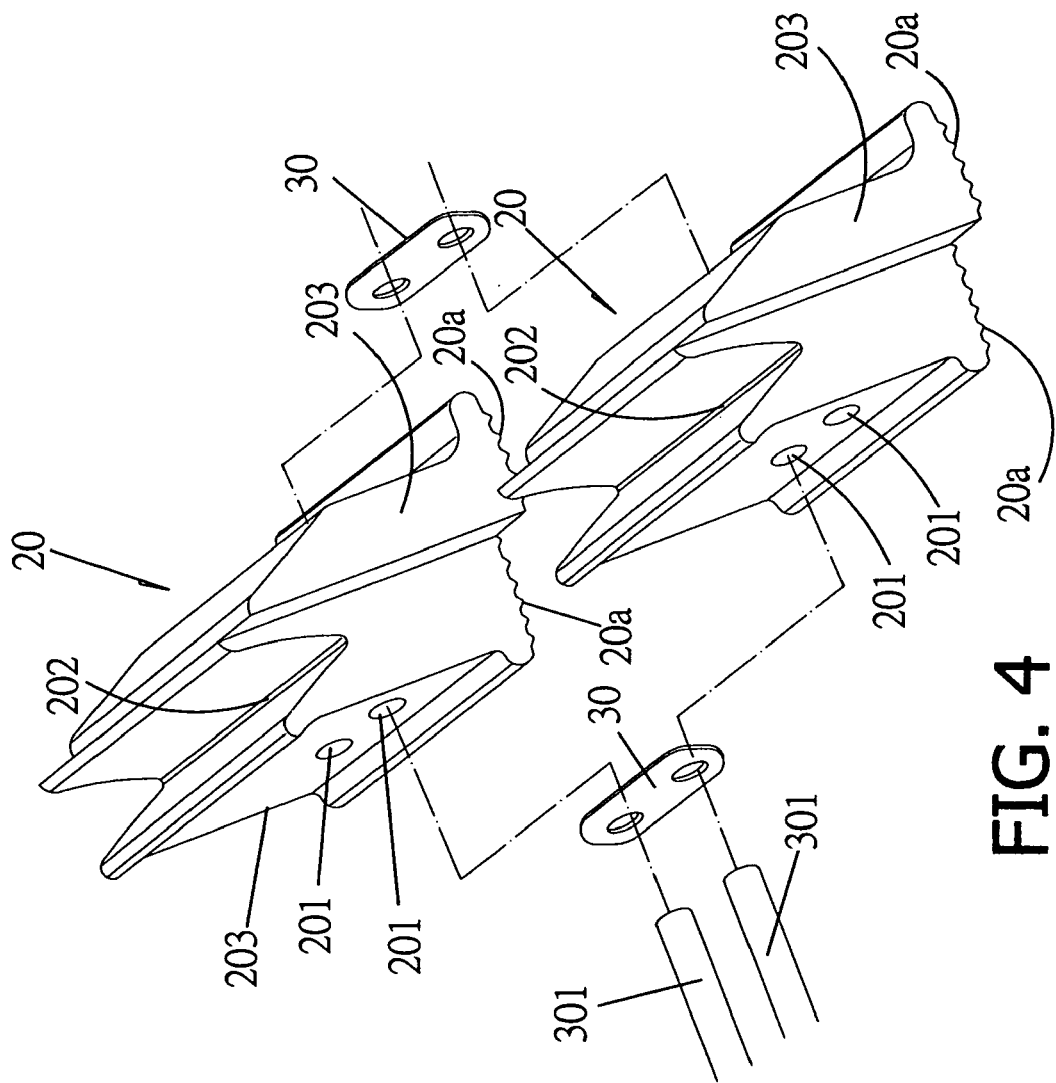
FIG. 4 is an exploded view of a part of an annular spare tire according to the present invention.
Figure 6:
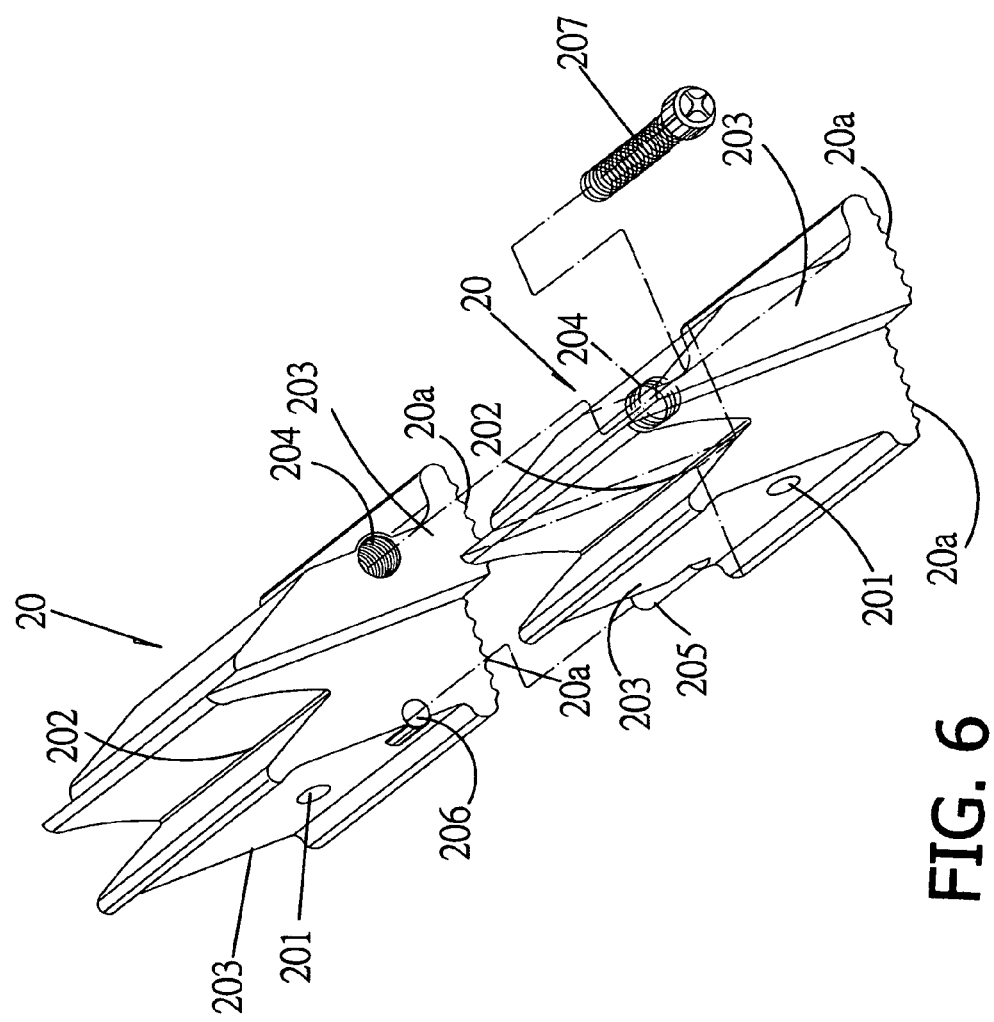
FIG. 6 is an exploded view showing the connection arrangement between the first spare tire block and the last spare tire block.

Referring to FIG. 1, an outer tire 10 is shown having two hooked flanges 101 respectively extended along the two opposite sidewalls thereof on the inside. The hooked flanges 101 have meshed screens (not shown) embedded therein to reinforce the strength.

Referring to FIGS. 2~6, spare tire blocks 20 are provided each having two mounting through holes 201 transversely extended through two opposite sides, a top locating groove 202 longitudinally disposed at the top, an embossed bottom wall 20*a*, and two projecting portions 203 diagonally disposed at two ends. Links 30 are symmetrically disposed at two sides and respectively fastened to the mounting through holes 201 by screw bolts 301 to connect the spare tire blocks 20 in series, keeping one projecting portion 203 of each spare tire block 20 abutted against one projecting portion 203 of another. Further, the first and last ones of the connected series of spare tire blocks 20 each have a screw hole 204 extended in parallel to the top locating groove 202, and a pinhole 206 or pin 205 at one end. By means of inserting the pin 205 of the last spare tire block into the pin hole 206 of the first spare tire block and the threading a screw 207 into the screw holes 204 of the first and last ones of the connected series of spare tire blocks, the spare tire blocks 20 are set to form an annular spare tire 1000.

Figure 7:
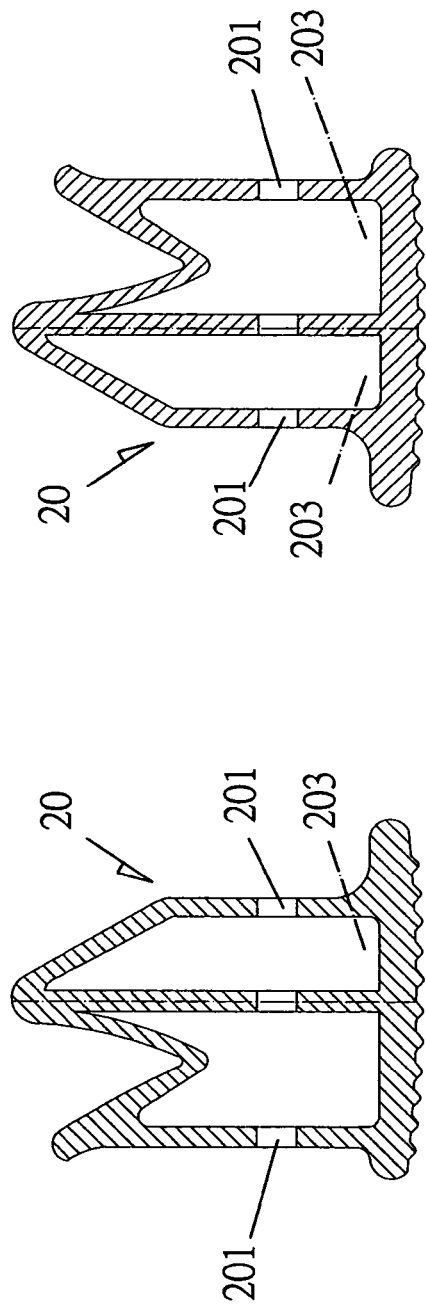
FIG. 7 is sectional front and rear views of the spare tire block according to the present invention.
Figure 8:
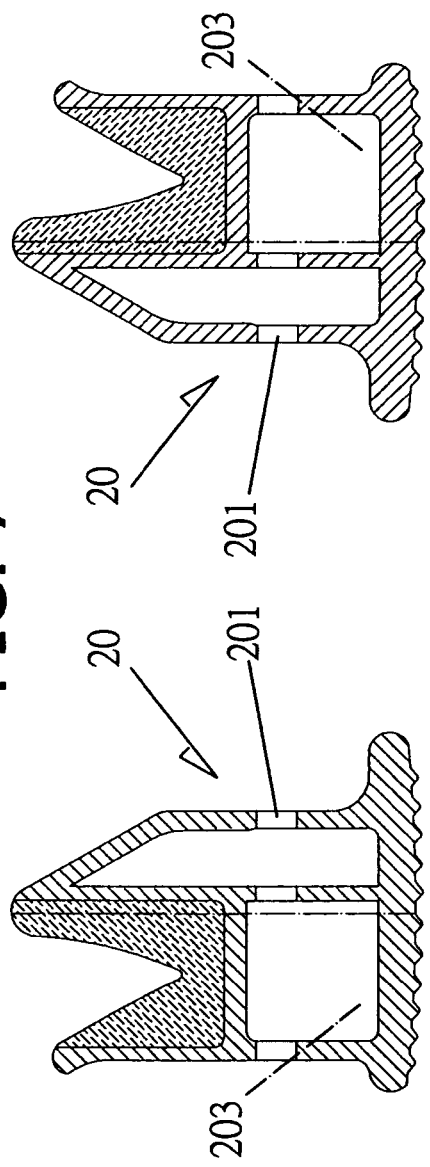
FIG. 8 illustrates the top locating groove of the spare tire block bonded with rubber material.

Referring to FIGS. 7 and 8, the spare tire blocks 20 are hollow block members made of high strength metal having a light weight (see FIG. 7). Rubber material may be directly molded on the top side of the spare tire blocks 20, forming the designed top locating groove 202 (see FIG. 8).

Figure 9:
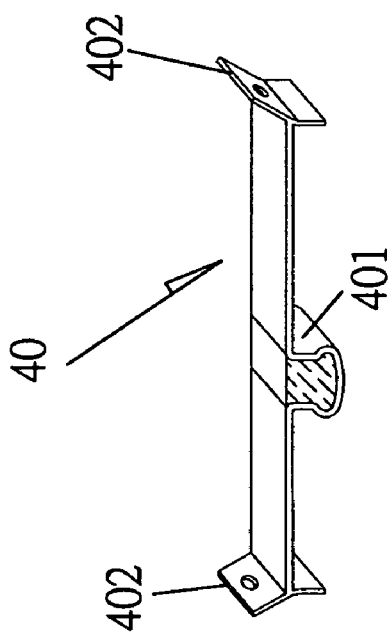
FIG. 9 is an elevational view of a stretcher according to the present invention.

Referring to FIG. 9, a narrow elongated stretcher 40 is shown having a substantially U-shaped middle part bonded with a rubber block 401 and two end lugs 402 at the ends.

Figure 11:
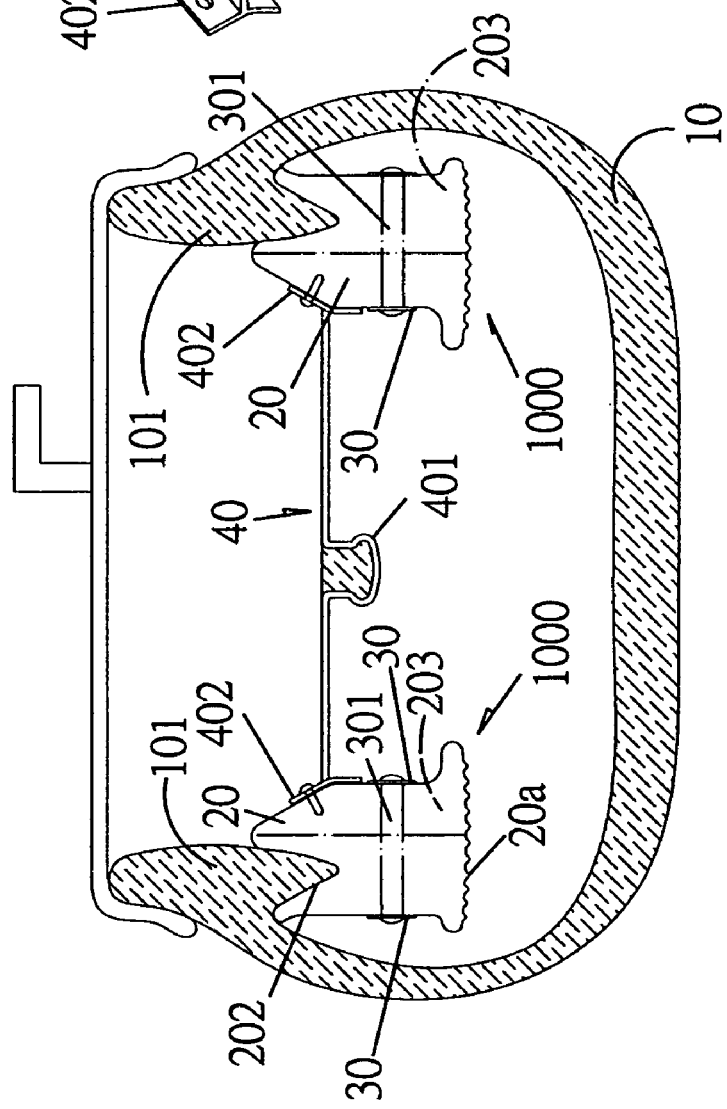
FIG. 11 is a sectional view showing the tire reinforcing arrangement installed in a wheel rim according to the present invention.

Referring to FIGS. 10 and 11 and FIG. 6 again, two annular spare tires 1000 are bilaterally set into the inside of the outer tire 10, and then the hooked flanges 101 of the outer tire 10 are respectively engaged into the top locating grooves 202 of the spare tire blocks 20, and then a number of stretchers 40 are set in between the two annular spare tires 1000.

By means of increasing or reducing the number of the spare tire blocks 20, the size of the annular spare tires 1000 is set subject to the size of the outer tire 10 used.

Because the spare tire blocks 20 can be made through a mass production process, the manufacturing cost of the present invention is not high.

A prototype of tire reinforcing arrangement has been constructed with the features of FIGS. 1~11. The tire reinforcing arrangement functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A tire reinforcing arrangement comprising:

an outer tire, said outer tire comprising hooked flanges respectively extended along two opposite sidewalls thereof on the inside;

two annular spare tires bilaterally set inside said outer tire, each annular spare tire including a plurality of spare tire blocks, each spare tire block including (a) two mounting through holes transversely extended through two opposite sides thereof, (b) a top locating groove adapted to receive said hooked flanges of said outer tire, (c) an embossed bottom wall, and (d) two projecting portions diagonally disposed at two ends, a plurality of links adapted to respectively join said plurality of spare tire blocks, and a plurality of screw bolts respectively fastened to said mounting through holes to secure said links to said spare tire blocks; and a plurality of stretchers respectively stopped between said annular spare tires, said stretchers each having two end lugs respectively stopped against said annular spare tires, a U-shaped middle part, and a rubber bonded to said U-shaped middle part.

\* \* \* \* \*